US011499522B2

(12) United States Patent
Van De Klippe

(10) Patent No.: US 11,499,522 B2
(45) Date of Patent: Nov. 15, 2022

(54) ROTOR ASSEMBLY AND A WINDMILL COMPRISING THE ROTOR ASSEMBLY

(71) Applicant: TouchWind Blue B.V., Eindhoven (NL)

(72) Inventor: Frederikus Van De Klippe, Eindhoven (NL)

(73) Assignee: TouchWind Blue B.V., Eindhoven (NL)

( * ) Notice: Subject to any disclaimer, the term of this patent is extended or adjusted under 35 U.S.C. 154(b) by 13 days.

(21) Appl. No.: 17/252,539

(22) PCT Filed: Jun. 5, 2019

(86) PCT No.: PCT/NL2019/050338
§ 371 (c)(1),
(2) Date: Dec. 15, 2020

(87) PCT Pub. No.: WO2019/245362
PCT Pub. Date: Dec. 26, 2019

(65) Prior Publication Data
US 2021/0254598 A1    Aug. 19, 2021

(30) Foreign Application Priority Data
Jun. 18, 2018   (NL) ...................................... 2021138

(51) Int. Cl.
*F03D 1/06* (2006.01)
*F03D 9/25* (2016.01)
*F03D 13/25* (2016.01)

(52) U.S. Cl.
CPC ............ *F03D 1/0666* (2013.01); *F03D 9/25* (2016.05); *F03D 13/25* (2016.05); *F05B 2220/706* (2013.01); *F05B 2240/93* (2013.01)

(58) Field of Classification Search
None
See application file for complete search history.

(56) References Cited

U.S. PATENT DOCUMENTS 4,415,813 A    11/1983   Carme
4,449,889 A *  5/1984   Belden ................. F03D 7/0216
                                                    416/102

(Continued)

OTHER PUBLICATIONS

International Search Report in International Application No. PCT/NL2019/050338, dated Sep. 24, 2019 (2 pages).

*Primary Examiner* — Courtney D Heinle
*Assistant Examiner* — Jason Fountain
(74) *Attorney, Agent, or Firm* — Nixon Peabody LLP

(57) ABSTRACT

A rotor assembly includes a rotor mast, a rotor and a pivot arrangement. The rotor mast is for rotatable attachment of the rotor assembly to a support structure for rotation of the rotor assembly relative to the support structure about a rotation axis. The rotor has two rotor blades extending in a virtual plane in a longitudinal direction. The two rotor blades are arranged to be propelled by air flow. The pivot arrangement defines a pivot axis. The rotor is pivotably connected to the rotor mast for pivoting the two rotor blades simultaneously relative to the rotor mast about the pivot axis. The longitudinal direction and a projection of said pivot axis in the virtual plane enclose a constant acute angle in the virtual plane. A windmill and a wind farm includes the rotor assembly with a capacity in the range of 15-50 MW/km$^2$.

18 Claims, 9 Drawing Sheets

(56) References Cited

U.S. PATENT DOCUMENTS

Figure 1:
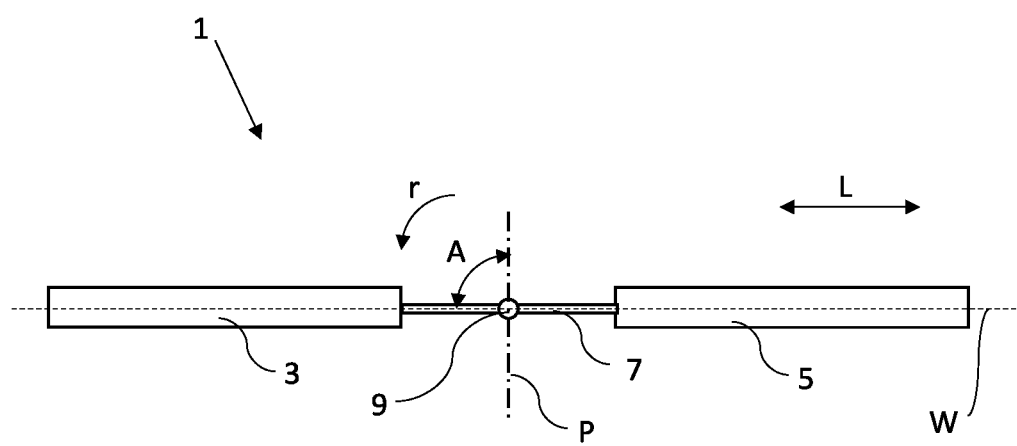

| | | | | |
|---|---|---|---|---|
| 7,614,852 B2* | 11/2009 | Clark | ................... | F03D 1/0641 416/243 |
| 8,770,934 B2* | 7/2014 | Perkinson | ............. | F03D 1/0666 416/102 |
| 2009/0091136 A1 | 4/2009 | Viterna | | |
| 2009/0160194 A1* | 6/2009 | Clark | ................... | F03D 1/0641 416/223 R |
| 2011/0142627 A1* | 6/2011 | Perkinson | ............... | F03D 13/20 416/41 |
| 2011/0266809 A1 | 11/2011 | Calverley | | |

* cited by examiner

ROTOR ASSEMBLY AND A WINDMILL COMPRISING THE ROTOR ASSEMBLY

CROSS-REFERENCE TO RELATED APPLICATIONS

This application is a national stage of Application No. PCT/NL2019/050338 filed Jun. 5, 2019 that claims the benefit of priority from Netherlands Application No. 2021138 filed on Jun. 18, 2018, which are both incorporated by reference in their entireties.

DESCRIPTION

According to a first aspect the present disclosure relates to a rotor assembly comprising:
- a rotor mast for rotatable attachment of said rotor assembly to a support structure for rotation of said rotor assembly relative to said support structure about a rotation axis,
- a rotor having two rotor blades extending in a virtual plane in a longitudinal direction, wherein said two rotor blades are arranged to be propelled by air flow, and
- a pivot arrangement defining a pivot axis, wherein said rotor is pivotably connected, by said pivot arrangement, to said rotor mast for pivoting said two rotor blades simultaneously relative to said rotor mast about said pivot axis.

According to a second aspect the present disclosure relates to a wind mill comprising a support structure and a rotor assembly according to the first aspect of the present disclosure.

According to a third aspect the present disclosure relates to a wind farm comprising a plurality of windmills according to the second aspect of the present disclosure.

Known rotor assemblies are for instance used as part of an gyrocopter. A gyrocopter, also known as a gyroplane or an autogyro, is a type of rotorcraft that uses an unpowered rotor in free autorotation to develop lift. The free-spinning rotor of a gyrocopter turns due to passage of air through the rotor. A drawback of these known rotor assemblies is that relative large vibrations may occur in the rotor mast.

An objective of the present disclosure is to provide a rotor assembly overcoming this drawback of the known rotor assembly.

This objective is achieved by the rotor assembly according to claim 1 wherein said longitudinal direction and a projection of said pivot axis in said virtual plane enclose an acute angle, preferably a constant acute angle, in said virtual plane. By providing said pivot axis in accordance with claim 1, a direction of the lift force generated by rotation of the rotor is relatively stable and highly aligned with the rotor mast and rotation axis thereby avoiding, or at least significantly reducing, vibrations due to a change of direction of the lift force by pivoting of the rotor blades about the pivot axis. This allows for a lighter and more cost efficient structure to be attached to the rotor assembly while maintaining a relative reliable construction.

The present disclosure relies at least partly on the insight that the direction of the lift force during rotation of the rotor of the known rotor assembly varies relative to the rotation axis thereby inducing vibrations in the rotor axis. It was noted that by providing the pivot axis such that a projection of said pivot axis in said virtual plane encloses an acute angle, preferably a constant acute angle, in said virtual plane an angle between the rotor blades and the rotation axis is maintained relatively stable, wherein said longitudinal direction is perpendicular to the rotation axis. Maintaining the angle between the rotor blades and the rotation axis relatively stable is beneficial for reducing vibrations.

The present disclosure further relies at least partly on the insight that for the known rotor assembly a pivoting speed about the pivot axis of the rotor blades is relatively small thereby causing a direction of the lift force that is not aligned with the rotor mast to change relatively slowly back in alignment with the rotor mast. By providing said pivot axis in accordance with claim 1, a change of direction of the lift force in alignment with the rotor mast is relatively fast thereby generating only limited variations.

A further advantage of the rotor assembly according to the first aspect of the present disclosure is that the rotor assembly may start rotating or maintain in rotation due to air flow passing the rotor in a direction that is substantially perpendicular to the rotation axis. Pivoting of said two rotor blades about said pivot axis results in a change of the blade angles relative to a given air flow direction. In other words, the blades pivot about an axis extending in the longitudinal direction of the two rotor blades. This causes a projection of a total surface area of the two rotor blades perpendicular to the air flow direction to increase when the pivot angle of the rotor about the pivot axis increases. Due to this increase of the projection of the total surface area of the two rotor blades the rotor may start rotating or be maintained in rotation when exposed to relative low air speed.

Within the context of the present disclosure the wording rotor blades arranged to be propelled by air flow is to be understood as rotor blades that are designed to be used for an unpowered rotor in free autorotation to develop lift as opposed to rotor blades for developing lift of helicopters by rotating the rotor via a drive arrangement such as an engine.

U.S. Pat. No. 4,449,889 A discloses a rotor assembly, wherein a projection of the pivot axis in the virtual plane is perpendicular in said virtual plane to the pivot axis.

Preferably the virtual plane is a flat virtual plane.

It is beneficial if said pivot axis is substantially perpendicular to said rotation axis. This is beneficial for reducing, during use of the rotor assembly, variations in rotation speed about the rotation axis of the rotor mast thereby reducing vibrations.

Preferably said acute angle is in the range of 10 to 45 degrees. This is advantageous for realizing the advantage of the rotor assembly according to the first aspect of the present disclosure to a relative large extent.

It is advantageous if said two rotor blades are rigidly connected to each other. This is advantageous for maintaining said two rotor blades in a virtual plane during use of the rotor assembly thereby reducing vibrations in the rotor assembly. Moreover, a rigid connection may incur a cost advantage during production of the rotor assembly. In addition, a rigid connection allows for rotor blades that are relative long in said longitudinal direction.

In a practical embodiment of the rotor assembly according to the first aspect said two rotor blades extend, in said longitudinal direction, into a further virtual plane comprising said rotation axis. Preferably said further virtual plane is a flat virtual plane.

It is beneficial if said rotor comprises a central rotor part between said two rotor blades, wherein a dimension of said central rotor part in a radial direction perpendicular to said longitudinal direction in said virtual plane adjacent to said rotor mast is in the range of 0.3-2 times the ratio of a blade area covered by said two rotor blades in said virtual plane divided by a length of said two rotor blade in said longitudinal direction. Such a central rotor part is beneficial for aerodynamically closing off at least a part, preferably completely, an area between said two rotor blades.

Preferably, a width of each of said two rotor blades perpendicular to said longitudinal direction in said virtual plane declines in dependence of a distance to said rotation axis. This is beneficial for realising a relative large lift force while realizing a relative small resistance of the rotor blades to the air flow.

In a practical embodiment of the rotor assembly according to the first aspect a cross section of each of said two rotor blades, in said virtual plane in a direction perpendicular to said longitudinal direction, comprises at a first side of said cross section a concave profile and at a second side of said cross section, opposite said first side, a convex profile. Rotor blades having a concave profile and a convex profile are beneficial for realizing a relative large lift force when exposed to air flow.

It is advantageous if said two rotor blades are formed as an integral structure. This is advantageous for realising a relative robust rotor assembly at relative low cost.

Preferably each of said two rotor blades extends 30 meters in said longitudinal direction. This is beneficial for realising a relative large lift force.

According to the second aspect the present disclosure relates to a windmill comprising a support structure and a rotor assembly according to the first aspect of the present disclosure, wherein said rotor assembly is rotatably attached to said support structure, by said rotor mast, for rotation of said two rotor blades about said rotation axis relative to said support structure. Embodiments of the windmill correspond to embodiments of the rotor assembly according to the first aspect of the present disclosure. The advantages of the windmill correspond to the advantages of the rotor assembly according to the first aspect of the present disclosure presented previously.

Preferably, said windmill comprises an electrical generator for generating electricity, wherein said rotor assembly is coupled to said electrical generator for generating said electricity upon rotation of said rotor assembly about said rotation axis. Providing the windmill according to the second aspect is beneficial for realising a windmill that is relatively robust.

It is beneficial if said rotor assembly is rotatably attached to said support structure at a first location of said support structure, said windmill further comprising a floating body for floating said windmill on water, wherein said floating body is attached to said support structure at a distance from said rotor assembly, wherein said rotor assembly is attached to said support structure such that an increase in wind speed, in use, causes said rotation axis of said rotor assembly to move towards an upright position. This embodiment is beneficial for placing the windmill according to the second aspect at open water such as a sea or a lake. Placing a windmill at open water is attractive due to the relative frequent presence of relative large air flow. Attaching the rotor assembly such that an increase in wind speed, in use, causes said rotor assembly to move said support structure towards an upright position is advantageous to maintain said rotor assembly of said windmill in rotation at relative large wind speeds. By moving the support structure towards an upright position the rotation axis of the rotor assembly moves towards a position wherein the rotation axis extends increasingly in a vertical direction. In other words, the rotation axis moves towards an upright position. As a result the force induced by the relative large wind speed may be maintained in a range wherein the rotor assembly can be maintained rotating about the rotation axis while avoiding, or at least significantly reducing, the risk of damage to the rotor assembly.

It is known that conventional windmills having a rotation axis that is maintained in a substantially horizontal position need to be taken out of operation at relative large wind speed to avoid, or at least significantly reduce, the risk of damage to the rotor assembly. At relative large wind speed the turbine and rotor assembly are pivoted about a vertical axis to place the rotor blades in a position wherein the air flow induces a relative low force on the rotor blades.

In this regard it is advantageous if said windmill comprises a counterweight that is attached to said support structure at a second location of said support structure, wherein said floating body is attached to said support structure between said first location and said second location, wherein said counterweight is arranged for lifting said rotor assembly above a water surface of said water when said rotor assembly is free from rotation about said rotation axis relative to said support structure. This is advantageous for realizing a relative large uptime and lifespan of the windmill by avoiding said rotor blades to contact the open water.

It is beneficial if said windmill comprises a balance buoy that is connected to said support structure at a third location of said support structure, wherein said third location is between said floating body and said rotor assembly, wherein said balance buoy is arranged for drawing said rotor assembly towards said water surface of said water. This is beneficial for positioning the rotor assembly relatively accurately above the water surface of the water. This is advantageous for realizing a relative large uptime and efficiency of the windmill.

In an embodiment said balance buoy is connected to said support structure via an adjustment element, preferably a winch, for varying a distance between said balance buoy and said support structure for moving said rotor assembly to a height above said water surface of said water. This is advantageous for lowering the rotor assembly towards the water surface for instance during maintenance of the rotor assembly. Moreover this is advantageous for raising the rotor assembly, ie. moving the rotor assembly away from the water surface, for instance during a storm.

The present disclosure further relates to a gyrocopter comprising a support structure and a rotor assembly according to the first aspect of the present disclosure, wherein said rotor assembly is rotatably attached to said support structure, by said rotor mast, for rotation of said two rotor blades about said rotation axis relative to said support structure. Embodiments of the gyrocopter correspond to embodiments of the rotor assembly according to the first aspect of the present disclosure. The advantages of the gyrocopter correspond to the advantages of the rotor assembly according to the first aspect of the present disclosure presented previously.

According to the third aspect the present disclosure the present disclosure relates to a wind farm comprising a plurality of windmills according to the second aspect of the present disclosure, wherein a nominal mutual distance between neighbouring windmills of said plurality of windmills is in a range of 1 to 6 times a diameter of said rotor. Embodiments of the wind form correspond to embodiments of the windmill according to the second aspect of the present disclosure. The advantages of the wind farm correspond to the advantages of the windmill according to the second aspect of the present disclosure presented previously.

Within the context of the present disclosure the nominal mutual distance is to be understood as a mutual distance for installation of neighbouring windmills.

In an embodiment of the windfarm, wherein each of said plurality of windmills comprises said floating body for floating said windmill (501) on water, the actual mutual distance between neighbouring windmills may vary due to flotation of the individual windmills.

Providing said plurality of windmills at a nominal mutual distance in the range of 4 to 6 time the diameter of the rotor is beneficial for realising a relative large extraction of energy from the air flow. Because a windmill extracts kinetic energy from the air flow, the air flow speed will have dropped after it passed the windmill. Since the kinetic energy that may be extracted from the air flow is proportional to the third power of the air flow speed, the drop in speed implies that a windmill of said plurality of windmills that is downwind of another windmill of said plurality of windmills is able to extract a lower amount of energy from the air flow.

Preferably, said nominal mutual distance is in a range of 4 to 4.5 times a diameter of said rotor. This is beneficial for realizing a relative high energy extraction from the air flow while said wind farm occupies only a relative small surface area.

Preferably, said nominal mutual distance is a distance between rotor masts of neighbouring windmills of said wind farm.

It is advantageous if said mutual distance is in a direction of said air flow.

The present disclosure relates to a wind farm comprising a plurality of windmills according to the second aspect of the present disclosure, wherein a capacity of said windfarm is in the range of 15-50 MW/km$^2$, preferably 25 MW/km$^2$. The advantages of the wind farm correspond to the advantages of the windmill according to the second aspect of the present disclosure presented previously.

Figure 2:
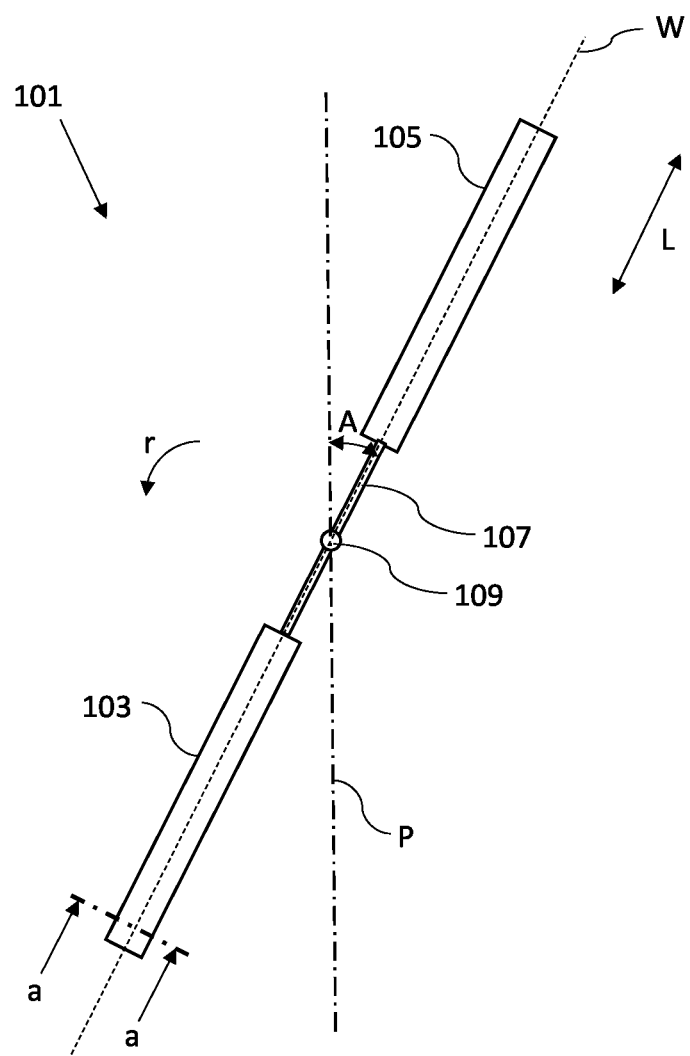
Figure 3:
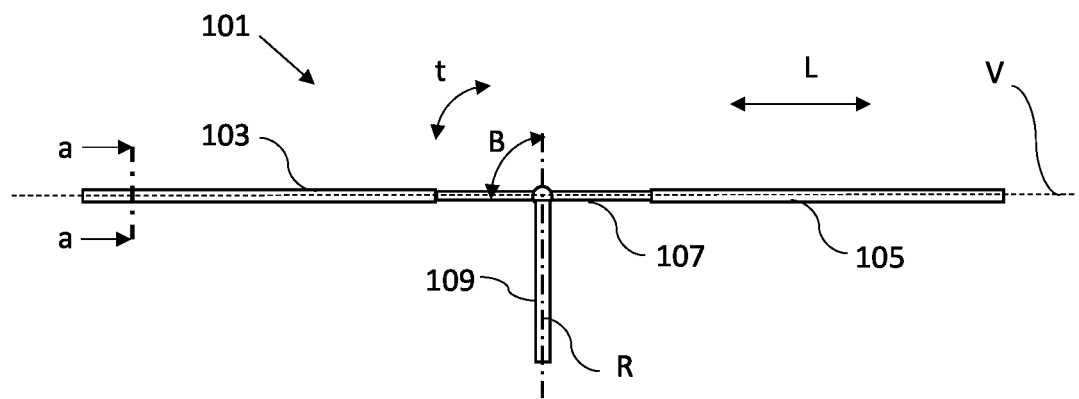
Figure 4:
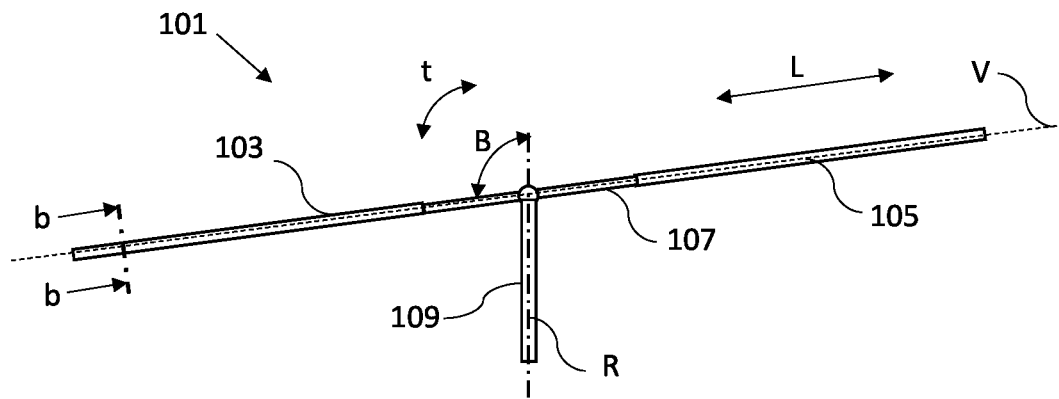
Figure 5:
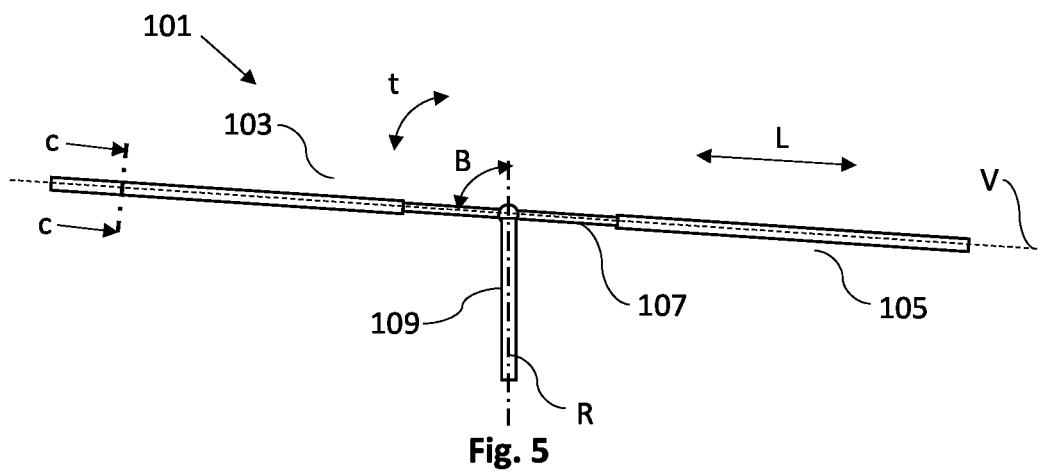
Figure 6:
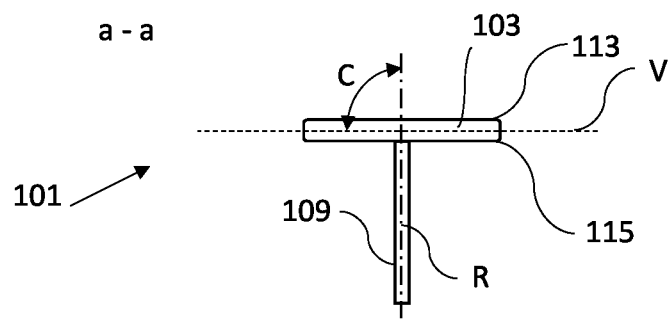
Figure 7:
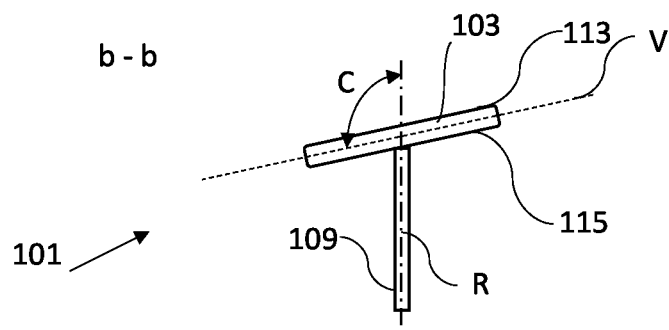
Figure 8:
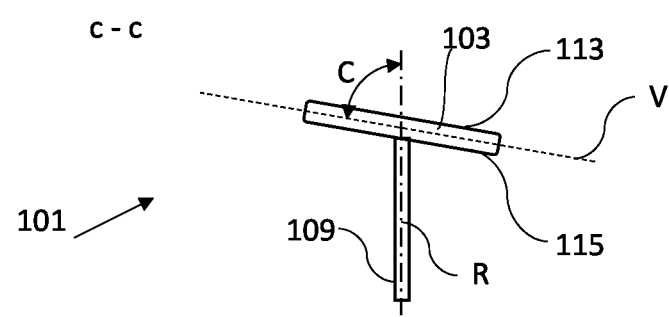
Figure 9:
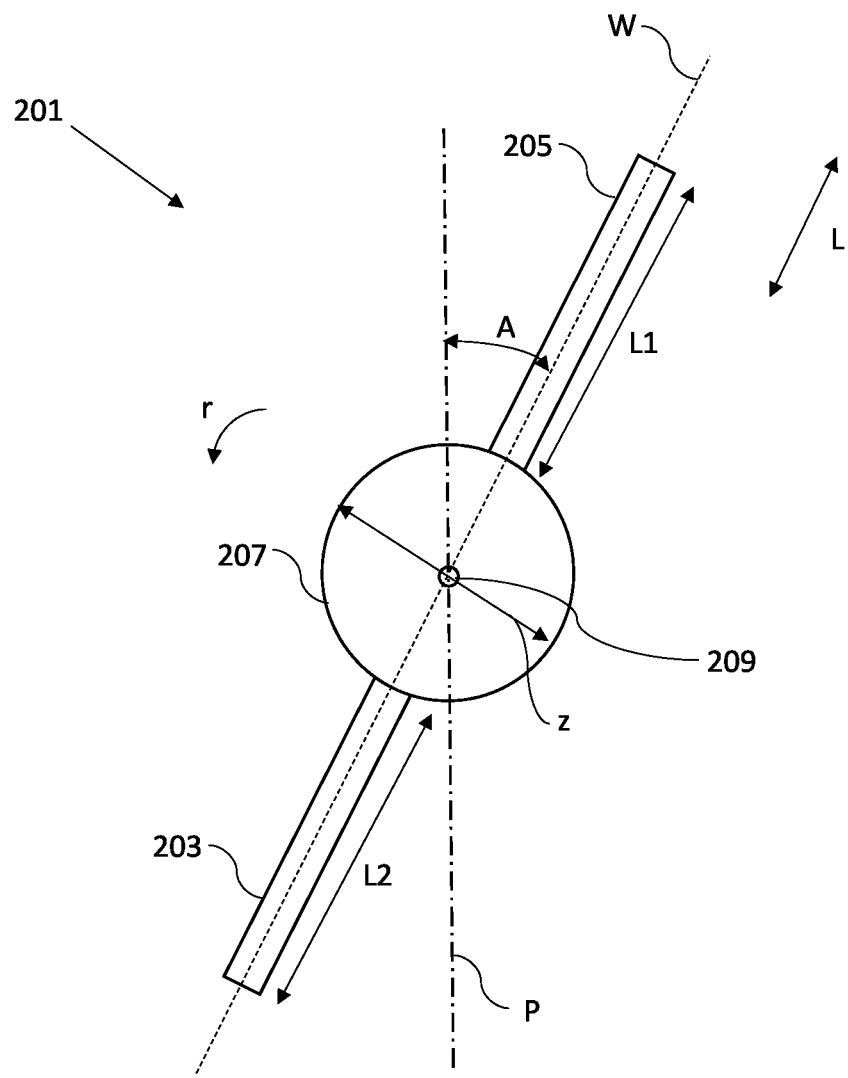
Figure 10:
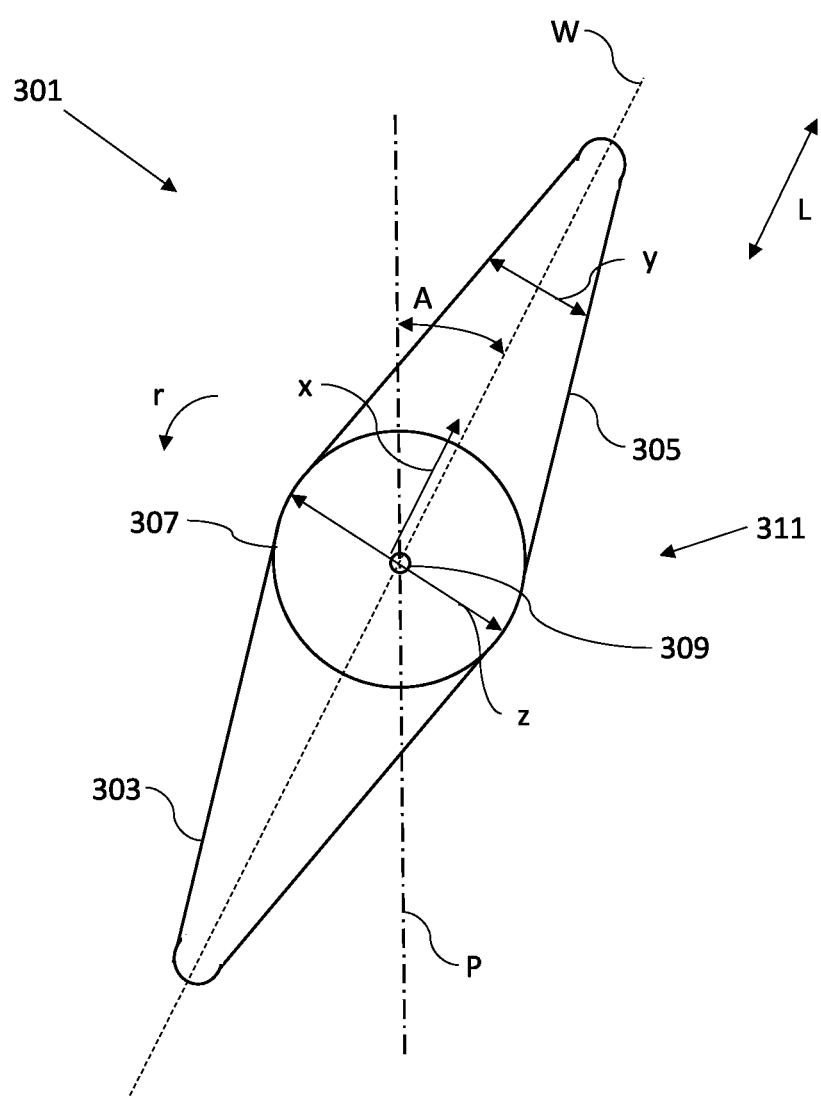
Figure 11:
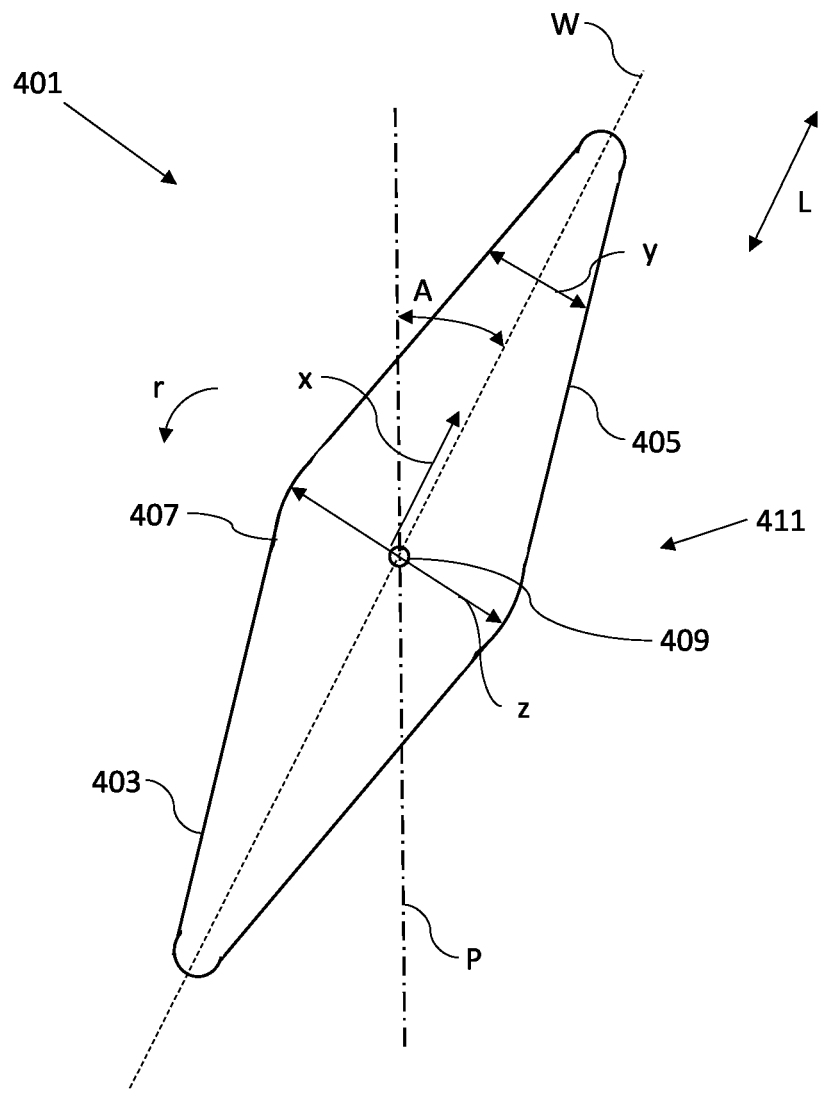
Figure 12:
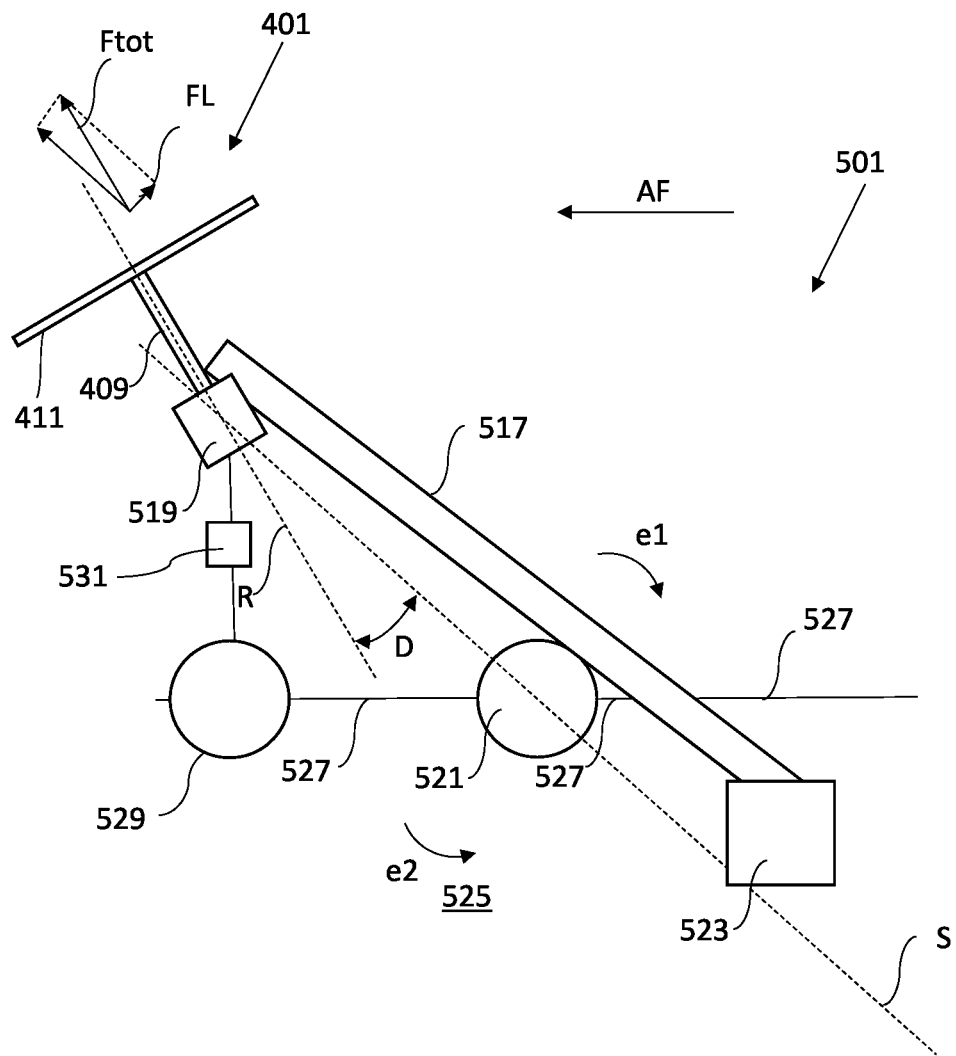
Figure 13:
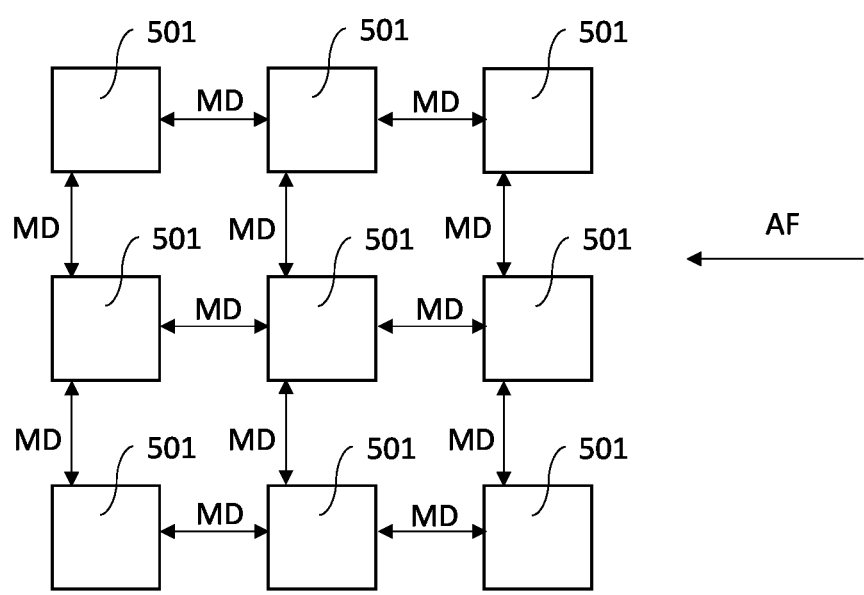

The present disclosure will now be explained by means of a description of preferred embodiments of a rotor assembly according to the first aspect of the present disclosure and embodiments of a windmill according to the second aspect of the present disclosure, in which reference is made to the following schematic figures, in which:

FIG. 1: a known rotor assembly not according to the invention is shown;

FIG. 2: a top view of a rotor assembly according to the present disclosure is shown;

FIG. 3-5: side views of the rotor assembly of FIG. 2 in different positions are shown;

FIG. 6: cross-section a-a of FIG. 3 is shown;

FIG. 7: cross-section b-b of FIG. 4 is shown;

FIG. 8: cross-section c-c of FIG. 5 is shown;

FIG. 9: a further embodiment of a rotor assembly according to the present disclosure is shown;

FIG. 10: a yet further embodiment of a rotor assembly according to the present disclosure is shown;

FIG. 11: another embodiment of a rotor assembly according to the present disclosure is shown;

FIG. 12: a side view of a windmill according to the present disclosure is shown;

FIG. 13: a wind farm according to the present disclosure is shown.

The known rotor assembly 1 shown in FIG. 1 comprises a first rotor blade 3 and a second rotor blade 5 extending in a longitudinal direction L. The first rotor blade 3 and the second rotor blade 5 are mutually rigidly connected via a central rotor part 7. The central rotor part 7 is pivotably connected to a rotor mast 9 allowing the central rotor part 7, the first rotor blade 3 and the second rotor blade 5 to pivot with respect to the rotor mast 9 about a pivot axis P in a first virtual plane W. Said first virtual plane W encloses an angle A of 90 degrees with said pivot axis P. In other words, said longitudinal direction L is perpendicular to said pivot axis P. The rotor mast 9 is arranged for rotatable attachment of said rotor assembly 1 to a support structure, not shown, for rotation of said rotor assembly 1 relative to said support structure in rotation direction r.

Rotor assembly 101 according to the present disclosure is provided with a first rotor blade 103 and a second rotor blade 105 extending in a longitudinal direction L. The first rotor blade 103 and the second rotor blade 105 are mutually rigidly connected via a central rotor part 107 and extend in a flat virtual plane V. The central rotor part 107 is pivotably connected to a rotor mast 109 allowing the central rotor part 107, the first rotor blade 103 and the second rotor blade 105 to pivot with respect to the rotor mast 109 about a pivot axis P. A first virtual plane W extending in said longitudinal direction L through said first rotor blade 103, said second rotor blade 105 and said central rotor part 109 encloses a constant acute angle of 30 degrees with said pivot axis P. The rotor mast 9 is arranged for rotatable attachment of said rotor assembly 1 to a support structure, not shown, for rotation of said rotor assembly 101 relative to said support structure in rotation direction r about a rotation axis R.

By pivoting said central part 107 about said pivot axis P in direction t, a first angle B and a second angle C between said central part 107 and said rotation axis R is altered. Angle B corresponds to the angle enclosed by the flat virtual plane V in said longitudinal direction L and the rotation axis R. Angle C corresponds to the angle enclosed by the flat virtual plain V in a direction perpendicular to said longitudinal direction L and the rotation axis R. In a first position, shown in FIG. 3, both angles B and C are 90 degrees. Tilting the central rotor part 107 in a counter clockwise direction, results in an increase of both angle B and angle C due to the acute angle A being between 0 and 90 degrees. For the same reason a tilt of the central rotor part 107 in a clockwise direction, both angle B and angle C decrease. The cross-section of the first rotor blade 103 shown in FIGS. 6, 7 and 8 is highly schematic. In a practical embodiment of the rotor blades 103 and 105 a first surface 113 has a concave profile and a second surface 115 at a second side of said cross section, opposite said first side, has a convex profile.

Rotor assembly 201 differs mainly from rotor assembly 101 in that the central part 207 is shaped such that a width z of said central rotor part 207 in a radial direction perpendicular to said longitudinal direction L in said virtual plane V adjacent said rotor mast 209 is in the range of 0.3-2 times the ratio of a blade area covered by said two rotor blades 203 and 205 in said virtual plane V divided by a total length L1 and L2 of said two rotor blades 203 and 205 in said longitudinal direction L. In other words, the central part 207 is formed such that no air can pass said rotor between said first rotor blade 203 and said second rotor blade 205 thereby avoiding, or at least significantly reducing, pressure loss across rotor assembly 201 near said rotor mast 209. Elements of rotor assembly 201 that are similar to elements of rotor assembly 101 are provided with a reference number equal to the reference number of the element in rotor assembly 101 raised by 100.

Rotor assembly 301 differs mainly from rotor assembly 201 in that the said central part 307, the first rotor blade 303 and the second rotor blade 305 are formed such that a width y of each of said two rotor blades 303 and 305 perpendicular to said longitudinal direction L in said virtual plane V and a width z of said central rotor part 307 in a radial direction perpendicular to said longitudinal direction L in said virtual plane V declines in dependence of a distance x to said rotation axis R. Elements of rotor assembly 301 that are similar to elements of rotor assembly 201 are provided with a reference number equal to the reference number of the element in rotor assembly 201 raised by 100.

Rotor assembly 401 differs mainly from rotor assembly 301 in that the said central part 307, the first rotor blade 303 and the second rotor blade 305 are formed as an integral part 411, wherein a width y of each of said integral part perpendicular to said longitudinal direction L in said virtual plane V declines in dependence of a distance x to said rotation axis R. Elements of rotor assembly 401 that are similar to elements of rotor assembly 301 are provided with a reference number equal to the reference number of the element in rotor assembly 301 raised by 100.

Windmill 501 comprises a rotor assembly 401 that is rotatably attached to support structure 517 via an electrical generator 519 of said windmill 501. Windmill 501 further comprises a floating body 521 and a counterweight 523 that are both attached to support structure 517. The floating body 521 is arranged for maintaining said windmill 501 floating on a water surface 527 of a water volume 525. The counterweight 523 is attached to said support structure 517 such that the floating body 521 is in between said counterweight 523 and said rotor assembly 401. A weight of the counterweight 523 and a distance of the counterweight 523 to said floating body 521 is such that when said rotor assembly 401 is free from rotation about said rotation axis R relative to said support structure 517 is said rotor assembly 401 is raised above said water surface 527. Windmill 501 further comprises a balance buoy 529. The balance buoy 529 is connected via a winch 531 to the support structure 517.

In use, when said rotor assembly 401 is propelled by air flow AF flowing with a wind speed in a direction indicated by the arrow in FIG. 12 a force Ftot that is aligned with said rotation axis R is exerted by said rotor assembly 401 on said support structure 517. The magnitude of the force Ftot depends on the wind speed of the air flow, the angles B and C, and the angle between the rotation axis R and the direction of the air flow AF. The rotation axis R is placed under an angle D with a virtual line S crossing said rotor assembly 401 and a virtual pivot axis of said floating body 521. By attaching the rotor assembly 401 at a predetermined angle D to said support structure 517 the force Ftot exerted by said rotor assembly 401 may result in a lower or higher lifting force FL due to rotation, in use, of the rotor assembly 401 about said rotation axis R relative to said support structure 517. If the rotation speed of the rotor assembly 401 about said rotation axis R relative to said support structure 517 increases, said support structure 517 rotates in direction e1 until a balanced position of said windmill 501 is obtained. If on the other hand the rotation speed of the rotor assembly 401 about said rotation axis R relative to said support structure 517 decreases, said support structure 517 rotates in direction e2 until a balanced position of said windmill 501 is obtained.

Wind farm 601 comprising a plurality of windmills 501. A nominal mutual distance MD between neighbouring windmills 501 of said plurality of windmills is 4 times a diameter of said rotor of said windmill 501.

The invention claimed is:

1. A rotor assembly (101, 201, 301, 401) comprising:
a rotor mast (109, 209, 309, 409) for rotatable attachment of said rotor assembly (101, 201, 301, 401) to a support structure for rotation of said rotor assembly (101, 201, 301, 401) relative to said support structure about a rotation axis (R),
a rotor having two rotor blades (103, 105, 203, 205, 303, 305, 403, 405) extending in a virtual plane (V) in a longitudinal direction (L), wherein said two rotor blades (103, 105, 203, 205, 303, 305, 403, 405) are arranged to be propelled by air flow and arranged to rotate in the virtual plane (V) and about the rotation axis (R), the virtual plane (V) being constant relative to the two rotor blades, and
a pivot arrangement defining a pivot axis (P), wherein said rotor is pivotably connected, by said pivot arrangement, to said rotor mast (109, 209, 309, 409) for pivoting said two rotor blades (103, 105, 203, 205, 303, 305, 403, 405) simultaneously relative to said rotor mast (109, 209, 309, 409) about said pivot axis (P),
characterized in that, said longitudinal direction (L) and a projection of said pivot axis (P) in said virtual plane (V) enclose a constant acute angle (A) in said virtual plane (V).

2. The rotor assembly (101, 201, 301, 401) according to claim 1, wherein said pivot axis (P) is substantially perpendicular to said rotation axis (R).

3. The rotor assembly (101, 201, 301, 401) according to claim 1, wherein said acute angle (A) is in the range of 10 to 45 degrees.

4. The rotor assembly (101, 201, 301, 401) according to claim 1, wherein said two rotor blades (103, 105, 203, 205, 303, 305, 403, 405) are rigidly connected to each other.

5. The rotor assembly (101, 201, 301, 401) according to claim 1, wherein said two rotor blades (103, 105, 203, 205, 303, 305, 403, 405) extend, in said longitudinal direction (L), into a further virtual plane (W) comprising said rotation axis (R).

6. The rotor assembly (301, 401) according to claim 1, wherein a width (y) of each of said two rotor blades (303, 305, 403, 405) perpendicular to said longitudinal direction (L) in said virtual plane (V) declines in dependence of a distance (x) to said rotation axis (R).

7. The rotor assembly (401) according to claim 1, wherein said two rotor blades (403, 405) are formed as an integral structure (411).

8. The rotor assembly (101, 201, 301, 401) according to claim 1, wherein each of said two rotor blades extends 30 meters in said longitudinal direction (L).

9. A windmill (501) comprising a support structure (517) and a rotor assembly (401) according to claim 1, wherein said rotor assembly (401) is rotatably attached to said support structure (517), by said rotor mast (409), for rotation of said two rotor blades about said rotation axis (R) relative to said support structure (517).

10. The windmill (501) according to claim 9, wherein said windmill (501) comprises an electrical generator (519) for generating electricity, wherein said rotor assembly (401) is coupled to said electrical generator (519) for generating said electricity upon rotation of said rotor assembly (401) about said rotation axis (R).

11. The windmill (501) according to claim 9, wherein said rotor assembly (401) is rotatably attached to said support structure (517) at a first location of said support structure (517), said windmill (501) further comprising a floating body (521) for floating said windmill (501) on water (525), wherein said floating body (521) is attached to said support structure (517) at a distance from said rotor assembly (401), wherein said rotor assembly (401) is attached to said support structure (517) such that an increase in wind speed (AF), in use, causes said rotation axis (R) of said rotor assembly (401) to move towards an upright position.

12. The windmill (501) according to claim 11, wherein said windmill (501) comprises a counterweight (523) that is attached to said support structure (517) at a second location of said support structure (517), wherein said floating body (521) is attached to said support structure (517) between said first location and said second location, wherein said counterweight (523) is arranged for lifting said rotor assembly (401) above a water surface (527) of said water (525) when said rotor assembly (401) is free from rotation about said rotation axis (R) relative to said support structure (517).

13. The windmill (501) according to claim 12, wherein said windmill (501) comprises a balance buoy (529) that is connected to said support structure (517) at a third location of said support structure (517), wherein said third location is between said floating body (521) and said rotor assembly (401), wherein said balance buoy (529) is arranged for drawing said rotor assembly (401) towards said water surface (527) of said water (525).

14. The windmill (501) according to claim 13, wherein said balance buoy (529) is connected to said support structure (517) via an adjustment element for varying a distance between said balance buoy (529) and said support structure (517) for moving said rotor assembly (401) to a height above said water surface (527) of said water (525).

15. A wind farm (601) comprising a plurality of windmills (501) according to claim 9, wherein a nominal mutual distance (MD) between neighbouring windmills (501) of said plurality of windmills (501) is in a range of 1 to 6 times a diameter of said rotor.

16. The wind farm (601) according to claim 15, wherein said nominal mutual distance (MD) is in a direction of said air flow.

17. The wind farm comprising a plurality of windmills (501) according to claim 9, wherein a capacity of said wind farm is in the range of 15-50 MW/km$^2$.

18. A rotor assembly (101, 201, 301, 401) comprising:
a rotor mast (109, 209, 309, 409) for rotatable attachment of said rotor assembly (101, 201, 301, 401) to a support structure for rotation of said rotor assembly (101, 201, 301, 401) relative to said support structure about a rotation axis (R),
a rotor having two rotor blades (103, 105, 203, 205, 303, 305, 403, 405) extending in a virtual plane (V) in a longitudinal direction (L), wherein said two rotor blades (103, 105, 203, 205, 303, 305, 403, 405) are arranged to be propelled by air flow, and
a pivot arrangement defining a pivot axis (P), wherein said rotor is pivotably connected, by said pivot arrangement, to said rotor mast (109, 209, 309, 409) for pivoting said two rotor blades (103, 105, 203, 205, 303, 305, 403, 405) simultaneously relative to said rotor mast (109, 209, 309, 409) about said pivot axis (P),
characterized in that, said longitudinal direction (L) and a projection of said pivot axis (P) in said virtual plane (V) enclose a constant acute angle (A) in said virtual plane (V), wherein said rotor comprises a central rotor part (207, 307, 407) between said two rotor blades (203, 205, 303, 305, 403, 405), wherein a dimension (z) of said central rotor part (207, 307, 407) in a radial direction perpendicular to said longitudinal direction (L) in said virtual plane (V) adjacent to said rotor mast (209, 309, 409) is in the range of 0.3-2 times the ratio of a blade area covered by said two rotor blades (203, 205, 303, 305, 403, 405) in said virtual plane (V) divided by a length of said two rotor blade (203, 205, 303, 305, 403, 405) in said longitudinal direction (L).

\* \* \* \* \*